(12) United States Patent
Chen

(10) Patent No.: US 11,408,729 B2
(45) Date of Patent: Aug. 9, 2022

(54) MEASURING SYSTEM AND METHOD

(71) Applicant: Skyverse Technology Co., Ltd., Guangdong (CN)

(72) Inventor: Lu Chen, Shenzhen (CN)

(73) Assignee: Skyverse Technology Co., Ltd., Shenzhen (CN)

(*) Notice: Subject to any disclaimer, the term of this patent is extended or adjusted under 35 U.S.C. 154(b) by 4 days.

(21) Appl. No.: 16/622,471

(22) PCT Filed: Jan. 22, 2018

(86) PCT No.: PCT/CN2018/073617
§ 371 (c)(1),
(2) Date: Dec. 13, 2019

(87) PCT Pub. No.: WO2018/227975
PCT Pub. Date: Dec. 20, 2018

(65) Prior Publication Data
US 2021/0148696 A1    May 20, 2021

(30) Foreign Application Priority Data

Jun. 14, 2017 (CN) .......................... 201710447669.9

(51) Int. Cl.
*G01B 11/06* (2006.01)
(52) U.S. Cl.
CPC ...... *G01B 11/0625* (2013.01); *G01B 2210/56* (2013.01)
(58) Field of Classification Search
CPC .................... G01B 11/0625; G01B 2210/56
See application file for complete search history.

(56) References Cited

U.S. PATENT DOCUMENTS 6,072,899 A * 6/2000 Irie ...................... G01B 11/24
348/125
9,709,386 B1 * 7/2017 Nicolaides ......... G01B 11/0641
(Continued)

FOREIGN PATENT DOCUMENTS

CN         104279978 A      1/2015
CN         106441125 A      2/2017
(Continued)

OTHER PUBLICATIONS

English translation of Office Action issued in Korean Patent Application No. 10-2020-700473 dated Nov. 15, 2021 (Year: 2021).*
(Continued)

*Primary Examiner* — Dominic J Bologna
(74) *Attorney, Agent, or Firm* — Marshall, Gerstein & Borun LLP

(57) ABSTRACT

The disclosure provides a metrology system, comprising: a lens assembly configured to receive reflected light from a sample surface and split the reflected light into at least a first reflected beam and a second reflected beam; an imaging unit configured to receive the first reflected beam to generate imaging data of the sample surface, wherein the imaging data includes distribution information of at least one detection area located in at least one detection region of the sample; a film thickness measuring unit configured to receive the second reflected beam, and obtain film thickness data of a specified object in the detection area; and a processing unit, communicatively coupled to the imaging unit and the film thickness measuring unit, and configured to: determine a detection path of the at least one detection area based on the distribution information, and cause the film thickness measuring unit to obtain film thickness data of the detection area based on the detection path, wherein, on an optical path, spectrum receiving surface of the imaging unit is configured to be optically conjugate with the sample (Continued)

surface, and a spectrum receiving surface of the film thickness measuring unit are configured to be optically conjugate with the sample surface.

18 Claims, 5 Drawing Sheets

(56) References Cited

U.S. PATENT DOCUMENTS

| | | | |
|---|---|---|---|
| 2013/0148877 A1* | 6/2013 | Claypool | G01B 11/22 382/145 |
| 2015/0106057 A1* | 4/2015 | Sugita | G01J 3/2823 702/167 |
| 2016/0025481 A1* | 1/2016 | Stanfield | G01B 11/0633 356/632 |
| 2018/0172431 A1* | 6/2018 | Okamoto | G01J 3/28 |

FOREIGN PATENT DOCUMENTS

| | | |
|---|---|---|
| CN | 107036539 A | 8/2017 |
| CN | 206974377 U | 2/2018 |
| KR | 10-2013-0083830 A | 7/2013 |
| WO | WO-2015/095237 A1 | 6/2015 |

OTHER PUBLICATIONS

International Search Report and Written Opinion for Application No. PCT/CN2018/073617, dated Apr. 20, 2018.

* cited by examiner

MEASURING SYSTEM AND METHOD

FIELD OF THE DISCLOSURE

The present disclosure is directed to the field of detection technology for semiconductor packaging and, more particularly, to a device and method for implementing a high precision, non-destructive measurement of film thickness of a detection area.

BACKGROUND

With the development of miniaturization and multi-functionality of electronic products, integrated circuits (IC) are gradually moving toward high density, small size, low power consumption and system level. IC packaging technology has entered the era of high-density packaging. As traditional packaging methods that continue to increase integration by reducing feature size are approaching the limit, three-dimensional packaging technology is a better choice. Three-dimensional packaging technology (also known as laminated chip packaging) refers to a packaging technology in which two or more chips are stacked vertically in a same package without changing the size of the package. Compared with traditional packaging technology, three-dimensional packaging technology not only reduces the device's size and weight and more effectively uses the available area of the silicon, but also allows the device to operate at a faster conversion rate.

Achieving three-dimensional packaging also requires related semiconductor fabrication techniques, such as TSV (Through Silicon Vias) technology, which uses vertical through-silicon vias to complete inter-chip interconnections. For the TSV process, it is generally necessary to detect the TSV hole size, position information, and the film thickness on the hole bottom. During measurement of the film thickness, the detection area is very small (the aperture size of TSV hole is generally of the order tens to hundreds of micrometers), the height of the detection area is greatly different, and the number of holes scattered on the chip is large.

There are currently some methods for measuring the film thickness on the TSV hole bottom. For example, film thickness analysis may be performed by SEM imaging. However, this method is a destructive measuring method that requires cutting the TSV hole and imaging on the side of the TSV hole. Therefore, this method can only be used for sampling studies and cannot achieve universal process monitoring.

Similar to the measurement of film thickness on TSV hole bottom, the chip processing process needs to measure the film thickness of a structure of several tens of micrometers, such as a groove, a square hole, a long hole, a columnar protrusion, a concentric circle and the like. With the development of processing technology, it is necessary to measure the film thickness of micron-sized structures.

Therefore, there is a need for a method for measuring the film thickness on a hole bottom that is adapted to universal process monitoring.

SUMMARY

For the above problems, a reflective spectrum measurement optical system and corresponding hardware and software implementation technical solutions are provided. The signal acquisition end of the optical system is designed to analyze the film thickness on the TSV hole bottom under the condition of large light spot illumination. The optical system can realize chip surface imaging to achieve TSV hole positioning and aperture size measuring functions in a same measurement system, thereby achieving automatic detection and analysis of TSV holes on the chip.

One aspect of the application discloses a system, comprising: a lens assembly configured to receive reflected light from a sample surface and split the reflected light into at least a first reflected beam and a second reflected beam; an imaging unit configured to receive the first reflected beam to generate imaging data of the sample surface, wherein the imaging data includes distribution information of at least one detection area located in at least one detection region of the sample; a film thickness measuring unit configured to receive the second reflected beam, and obtain film thickness data of a specified object in the detection area; and a processing unit, communicatively coupled to the imaging unit and the film thickness measuring unit, and configured to: determine a detection path of the at least one detection area based on the distribution information, and cause the film thickness measuring unit to obtain film thickness data of the detection area based on the detection path, wherein, on an optical path, a spectrum receiving surface of the imaging unit is configured to be optically conjugate with the sample surface, and a spectrum receiving surface of the film thickness measuring unit are configured to be optically conjugate with the sample surface. In one embodiment, the detection area includes a recession or a protrusion.

According to the above embodiment, it is able to measure the film thickness of a plurality of detection areas distributed on the surface of the sample (for example, a chip) without causing damage to the chip.

In one embodiment, the processing unit is further configured to: determine the at least one detection region based on a regional characteristic of the sample surface, thereby determining a detection path of the at least one detection region; and determine the distribution of the detection area located in the at least one detection region based on a characteristic of the detection area, thereby determining the detection path of the detection area.

This embodiment describes the determination of the detection path of the hole. Generally, there may be multiple detection regions on the sample. The processing unit may identify the detection regions based on imaging data, and then determine the detection path of the detection regions, that is, the detection order. The current detection region is determined according to the detection path, and then the detection path of the detection area is determined based on the distribution of the detection area on the current detection region.

In one embodiment, when the detection area includes a hole to be measured, the processing unit is further configured to: obtain circular hole information based on the imaging data, wherein the circular hole information includes distribution information and characteristic information of the circular hole; and determine the distribution of the hole to be measured on the sample surface based on a characteristic of the hole to be measured and the circular hole information.

The processing unit may first obtain the distribution and characteristics of the circular holes on the sample, such as the position and size of the circular holes. Then, based on the characteristics such as the size and shape of the hole to be measured, the hole to be measured is determined from the circular holes.

In one embodiment, the film thickness measuring unit comprises: at least one aperture, disposed between the spectrum receiving surface of the film thickness measuring unit and the lens assembly along the optical path, so that the spectrum receiving surface of the film thickness measuring unit only receives reflected light from the detection area. In particular, the film thickness measuring unit comprises a first aperture configured to filter out reflected light with a first characteristic and a second aperture configured to filter out reflected light with a second characteristic.

In one embodiment, a reflection angle of the reflected light with the first characteristic is less than a reflection angle of the second aperture with the second characteristic.

In one embodiment, the first aperture is disposed coaxially with the second aperture. An aperture size of the first aperture is greater than an aperture size of the second aperture.

By arranging at least one aperture in front of the spectrometer to filter out the reflected light outside the hole, so that it can realize small area measurement in the case of a large imaging area.

In one embodiment, the designated detection area is determined by at least one of: determining, by the processing unit, the designated detection area according to the detection path of the at least one detection area; and determining, by the processing unit, the designated area based on a user input.

In one embodiment, the system further comprises an electrical platform configured to carry the sample, wherein the electrical platform moves under control of the processing unit; and a light source assembly configured to provide an incident beam to the sample surface, wherein the light source assembly includes a xenon lamp.

Another aspect of the application discloses a method, comprising: obtaining imaging data of a sample surface based on a first reflected beam from the sample, wherein the imaging data includes distribution information of a detection area located in at least one detection region of the sample; obtaining film thickness data of the detection area based on a second reflected beam from the sample surface; and determining a detection path of the detection area based on the distribution information, and obtaining film thickness data of each detection area based on the detection path.

In one embodiment, determining the detection path of the at least one detection area based on the distribution information comprises: determining the at least one detection region based on a regional characteristic of the sample surface, thereby determining a detection path of the at least one detection region; and determining the distribution of the detection area located in the at least one detection region based on a characteristic of the detection area, thereby determining the detection path of the detection area.

In one embodiment, when the detection area includes a hole to be measured, determining the distribution of the hole to be measured in the at least one detection region based on the characteristic of the hole comprises: obtaining circular hole information based on the imaging data, wherein the circular hole information includes distribution information and characteristic information of the circular hole; and determining the distribution of the hole to be measured in the at least one detection region based on a characteristic of the hole to be measured and the obtained circular hole information.

Another aspect of the application discloses a metrology method, comprising: splitting reflected light from a sample surface into at least a first reflected beam and a second reflected beam; generating imaging data of the sample surface based on the first reflected beam, wherein the imaging data includes distribution information of a detection area located in at least one detection region of the sample; determining position information of the detection area based on the distribution information, and obtaining film thickness data of the detection area based on the second reflected beam and the distribution information.

In one embodiment, the method further comprises: determining a detection path of the detection area based on the distribution information, wherein based on a regional characteristic of the sample surface, the at least one detection region and a detection path of the at least one detection region are determined; and wherein based on a characteristic of the detection area, the distribution of the detection area located in the at least one detection region and the detection path of the detection area are determined.

In one embodiment, when the detection area includes a hole to be measured, obtaining circular hole information based on the imaging data, wherein the circular hole information includes distribution information and characteristic information of the circular hole; and determining the distribution of the hole to be measured on the at least one detection region based on a characteristic of the hole to be measured and the obtained circular hole information.

In one embodiment, wherein before splitting the reflected light from the sample into the first reflected beam and the second reflected beam, the method further comprises providing a system of claim 1, wherein splitting, by the lens assembly, the reflected light into the first reflected beam and the second reflected beam; obtaining, by the imaging unit, the imaging data of the detection area; obtaining, by the film thickness measuring unit, the film thickness data of the detection area; determining, by the processing unit, the position information; and causing, by the processing unit, the film thickness measuring unit to obtain the film thickness data of the detection area.

The invention realizes small area measurement under the condition of large spot illumination in an optical system, so that large area imaging and small area film thickness measuring can be realized in the same optical system, and then an automatic analysis of TSV holes on the chip is achieved. The invention is a non-contact measuring method, which may not cause damage to the chip or cause pollution, and has a fast measurement speed, and can be used for process monitoring in the production process.

BRIEF DESCRIPTION OF THE DRAWINGS

The embodiments are shown and explained with reference to the drawings. These drawings serve to clarify the basic principles and thus show only the aspects necessary for understanding the basic principles. These drawings are not to scale. In the drawings, the same reference numerals denote similar features.

DETAILED DESCRIPTION

Figure 1:
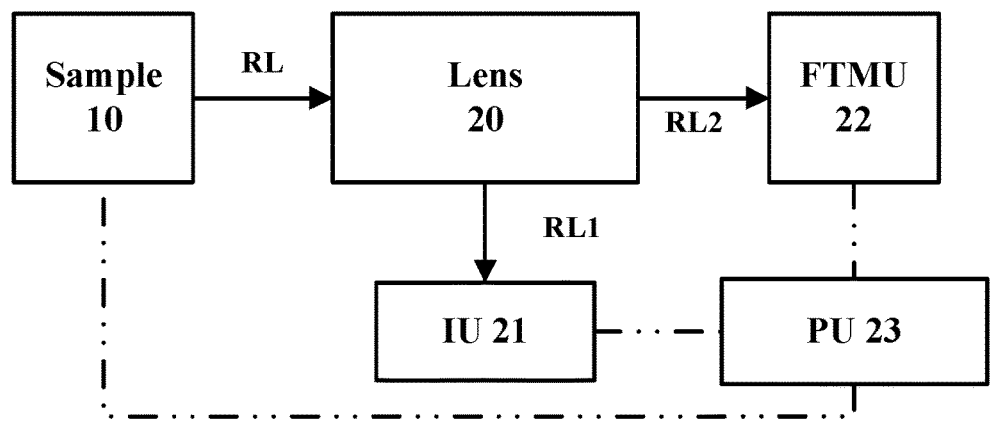
FIG. 1 is a block diagram of a TSV hole measuring system in accordance with an embodiment of the present invention.

In the detailed description of the following embodiments, reference is made to the accompanying drawings which form a part of the invention. The accompanying drawings illustrate, by way of example, specific embodiments. The exemplary embodiments are not intended to be exhaustive of all embodiments in accordance with the invention. It is to be understood that other embodiments may be utilized and structural or logical modifications may be made without departing from the scope of the invention. Therefore, the following detailed description is not limiting, and the scope of the invention is defined by the appended claims.

Techniques, methods and apparatus known to those of ordinary skill in the relevant art may not be discussed in detail, but the techniques, methods and apparatus should be considered as part of the specification, where appropriate.

For measurement of TSV hole bottom film, since the detection area is very small, it is necessary to eliminate signal interference in the area outside the hole. The invention provides an optical system in which the signal acquisition end is designed to achieve film thickness analysis of TSV hole bottom under the condition of large spot illumination. The surface of the chip can also be imaged using the optical path of the system, so that the system can realize TSV hole positioning and aperture size measuring, thereby realizing automatic detection and analysis of the TSV holes on the chip.

The definitions of some of the terms used in this application are provided. In the present application, the lens assembly may include any objective lens, tube lens, beam splitter, etc. that meets the requirements. When imaging the surface of the sample to be measured (hereinafter referred to sample), high-magnification imaging and low-magnification imaging are intended to illustrate different magnifications or application scenarios of the two imaging images, and are not intended to limit the specific imaging magnification. In addition, in the present application, the light emitted from the outside of the hole to be measured has a small angle or a large angle, and the two types of angle here are intended to represent the difference in the angle at which the reflected light is generated. These two types of angles are not limited to specific values.

It should be noted that the invention may also be used to measure other types of recessions and projections. For example, the detection area may include, but is not limited to, a cylinder, a groove, a long hole, a concentric circle and the like on the chip. Hereinafter, for ease of explanation of the concept of the present invention, a detection area including a hole to be measured (for example, TSV holes) is described as an example. Those skilled in the art would appreciate that TSV holes are used as an example only, and are not intended to limit the scope of application of the present invention.

Based on the above concept, the TSV hole measuring system proposed by the present invention comprises two optical branches.

FIG. 1 is a block diagram of a TSV hole measuring system in accordance with an embodiment of the present invention. The system includes an electrical platform (not shown) for carrying a sample 10, a lens assembly 20, an imaging unit (IU) 21, a film thickness measuring unit (FTMU) 22 and a processing unit (PU) 23.

The lens assembly 20 is configured to receive reflected light from the sample 10 and split the reflected light into at least a first reflected beam and a second reflected beam.

The imaging unit 21 is configured to receive the first reflected beam to obtain imaging data of a surface of the sample 10 (hereinafter referred as sample surface), wherein the imaging data includes distribution information of a hole to be measured (including but not limited to a TSV hole) in at least one detection region of the sample 10. The distribution information herein may include, but is not limited to, the position and distribution of the hole in the detection region.

When the sample surface is imaged at a low magnification, the imaging unit 21 may receive the first reflected beam and generate imaging data of the sample surface. After receiving the imaging data, the processing unit 23 may divide the detection regions according to the regional characteristics of each detection region on the sample surface (for example, the mark at the edge of each region), thereby determining the detection path of the detection regions. When the sample surface is imaged at a high magnification, the imaging unit 21 may receive the first reflected beam corresponding to the high magnification, thereby obtaining more detailed characteristics of the sample surface, for example, a plurality of circular holes distributed in a certain region on the sample surface. The processing unit 23 may obtain circular hole information including distribution information and characteristic information of the circular hole based on the imaging data, and determines which of the circular holes is the hole to be measured (for example, the TSV hole) based on the characteristics of the hole to be measured and the obtained circular hole information, thereby obtaining the distribution of the hole to be measured on the sample surface.

Under the condition of high magnification imaging, the film thickness measuring unit 22 receives the second reflected beam and analyzes the film thickness on the hole bottom of the sample 10 based on the second reflected beam. The film thickness measuring unit 22 may filter out the light irrelevant to the film thickness on the hole bottom from the second reflected beam, thereby obtaining data characterizing the film thickness on the hole bottom only. The processing unit 23 may determine the detection path of the hole according to the distribution information, and cause the film thickness measuring unit 22 to obtain the data of the film thickness on a designated hole bottom based on the detection path, thereby implementing measurement of the hole in at least one detection region. It should be noted that the "designated hole", which is selectively measured, may be determined by the processing unit 23 according to the detection path, or may be determined by the processing unit 23 based on a user input.

Based on the above, the processing unit 23 may obtain the position and distribution of the hole in the detection region using the distribution information, thereby determining the detection path of the hole. When the processing unit 23 determines that there is only one detection region, the processing unit 23 performs detection path planning for the hole(s) in the detection region; when there are more than two detection regions, the processing unit 23 firstly performs detection path planning on the detection region level for the detection regions, and then determines the detection path of the holes in the detection region based on the detection path of the detection regions. After obtaining the distribution of the holes in the current detection region, the processing unit 23 obtains the data of film thickness on each hole bottom based on the detection path of the holes, thereby realizing the measurement of the holes in the detection region. That is, the film thickness data of the hole bottom is associated with the coordinates or other marks of the hole to obtain the film thickness data of hole bottom on the entire sample 10.

In order to make a one-to-one correspondence between the bottom of the hole to be measured and the image formed on the imaging unit 21 and the film thickness measuring unit 22, the sample 10, the imaging unit 21 and the film thickness measuring unit 22 are positioned according to the conjugate relationship between the object plane and the image plane on the optical path. In other words, on the optical path, a spectrum receiving surface of the imaging unit 21 and a spectrum receiving surface of the film thickness measuring unit 22 are disposed to be optically conjugate with a reflecting surface of the sample 10.

Although a light source and some related components are not depicted in FIG. 1, those skilled in the art should appreciate that the measuring system may include suitable light sources and related components. In addition, although FIG. 1 shows the processing unit 23 as a separate module, the function of the processing unit 23 may be integrated into the imaging unit 21 and the film thickness measuring unit 22, so that both the imaging unit 21 and the film thickness measuring unit 22 are provided with processing data capabilities. In some embodiments, the processing unit 23 may be a computer, an application specific integrated circuit (ASIC), integrated in each image acquisition unit, or a separate hardware and software module or the like.

Figure 2:
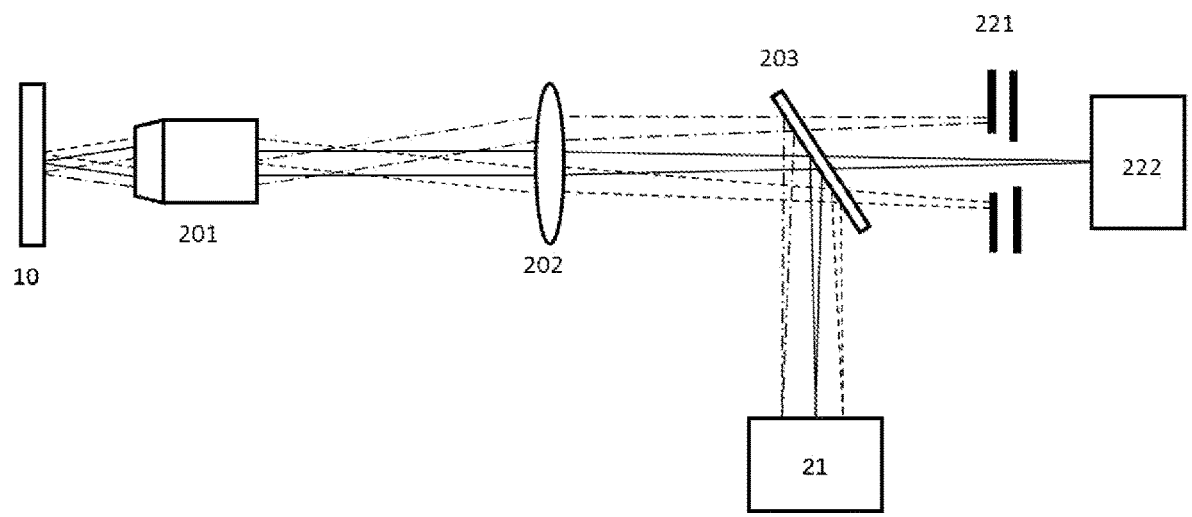
FIG. 2 is a schematic diagram illustrating an optical path of the TSV hole measuring system shown in FIG. 1.

The TSV hole is taken as an example below. FIG. 2 is a schematic view of the optical path of the TSV hole measuring system shown in FIG. 1. The TSV hole measuring system has a light source of xenon lamp and has a measurement wavelength of 380-700 nanometer. For ease of explanation, the incident light source assembly is not shown in the measuring system.

Referring to FIG. 2, the TSV hole measuring system includes an objective lens 201, a tube lens 202, a beam splitter 203, an imaging unit 21, a signal selective receiving component 221, and a spectrometer 222 disposed in front of the sample 10 along an optical transmission path. The optical signal transmission path of the measuring system will be described below.

First, the output light of the light source is coupled to an illumination fiber port (not shown) via an optical fiber, and is shaped by an illumination lens assembly (not shown) and incident on the objective lens 201 through a beam splitter (e.g. 50/50 beam splitter). Then, it is incident on the surface of the sample 10 in a converging vertical state and reacts with the sample 10 to generate reflected light. The reflected light is collected by the objective lens 201, shaped by the tube lens 202, and reaches the beam splitter 203. The beam splitter 203 splits the emitted light of the tube lens 202 into at least a first reflected beam and a second reflected beam, wherein the first reflected beam is received by the imaging unit 21 (for example, an imaging CCD) for imaging, and the second reflected beam passes through the signal selective receiving component 221 and is received by the spectrometer 222.

In practical applications, the reference spectrum measurement is performed after the measuring system is built. Specifically, a mirror is placed on an electrical platform used for the sample 10, and the height of electrical platform is adjusted so that the beam irradiated to the surface of the mirror is in a converging state. The spectrum distribution obtained by the selective receiving component 221 is measured by a spectrum analyzer 222, and the spectrum distribution obtained at this time is the reference spectrum.

The imaging unit 21 performs imaging based on the output light of the tube lens 202, and realizes TSV hole identification, positioning, and aperture size analysis by image recognition. After determining the position of the TSV hole, the TSV hole to be measured is moved to the center of the illumination spot by the electrical platform for carrying the sample 10, and the spot is focused to the bottom of the TSV hole. At the film thickness measurement end, the spectrum distribution through the selective receiving component 221 is measured by the spectrometer 222. By dividing the spectrum distribution by the aforementioned reference spectrum, a reflection spectrum distribution can be obtained, thereby realizing analysis of the film thickness on the TSV hole bottom.

Figure 3A:
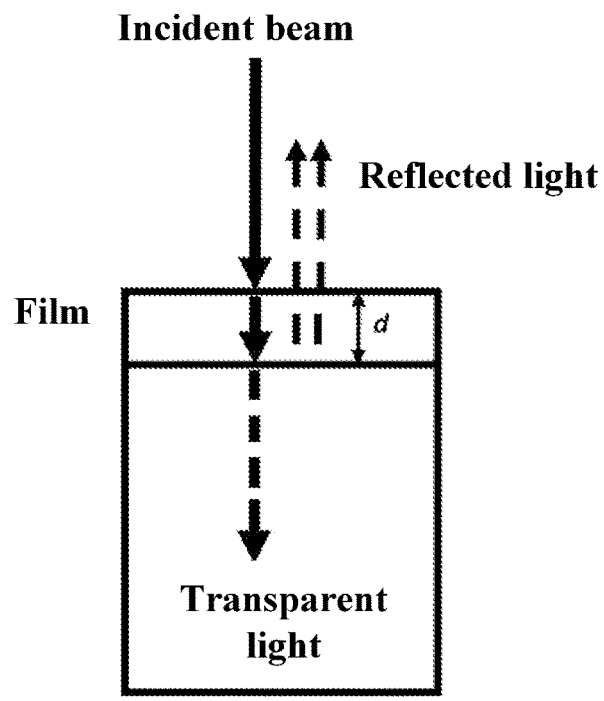
FIG. 3A is a schematic diagram illustrating the principle of measuring film thickness.

In the present embodiment, the analysis of the film thickness on the TSV hole bottom is implemented in accordance with the principle of film thickness measurement shown in FIG. 3A. The incident beam is incident perpendicularly to the sample surface, and the reflected light is coherently superposed by the reflected light on the upper and lower surfaces of the film of the sample. The optical path difference between the reflected light on the upper and lower surfaces determines the reflectance. The optical path difference is determined by the wavelength of light, the film thickness d, and the refractive index. When the refractive index of the film is known, the film thickness can be determined by measuring the change in reflectance over a range of wavelengths.

Figure 3B:
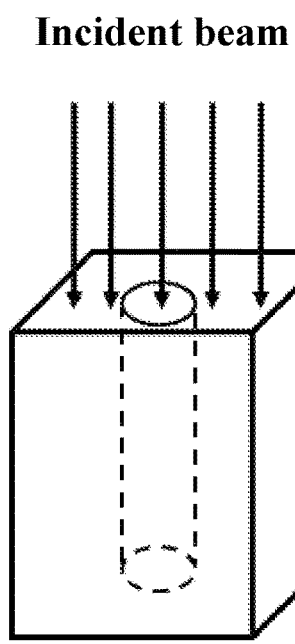
FIG. 3B is a part of schematic diagram illustrating measurement of the film thickness on the TSV hole bottom according to an embodiment of the invention.

Both FIGS. 3A and 3B illustrate measurement of the film thickness on the TSV hole bottom.

Since the illumination portion produces reflected light, for the film thickness measurement of the TSV hole bottom, it is necessary to focus the spot to the TSV hole bottom and determine the film thickness based on the reflection spectrum from the hole bottom.

Figure 3C:
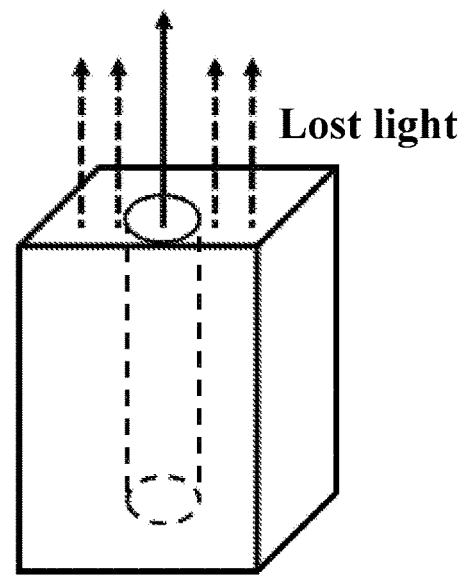
FIG. 3C is another part of schematic diagrams showing measurement of the film thickness on the TSV hole bottom according to an embodiment of the invention.

As shown in FIG. 3B and FIG. 3C, when the incident beam is focused to the TSV hole bottom, both the peripheral region of the hole and the hole bottom generate reflected light. Therefore, in order to measure the film thickness on the hole bottom, it is necessary to filter out the reflected light generated by the peripheral region of the hole (that is, the lost light), and then analyze the reflected light from the hole bottom to obtain the film thickness. The signal selective receiving component 221 of FIG. 2 filters the emitted light such that only the reflected light from the hole bottom may be received by the spectrometer 222 while attenuating the reflected light generated by the peripheral region of the hole. Thus, a large illumination range and a small detection area are achieved.

Figure 4:
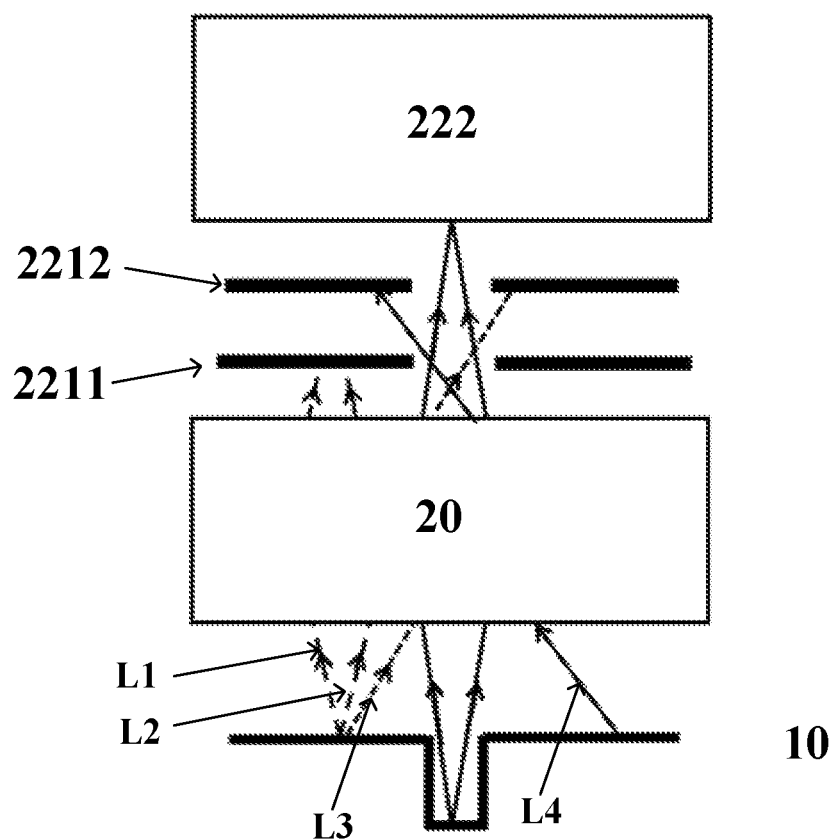
FIG. 4 is a schematic diagram illustrating a signal selective receiving assembly according to an embodiment of the present invention.

The signal selective receiving component 221 is described in detail in conjunction with FIG. 4.

The selective receiving component 221 includes at least one aperture disposed between the spectrometer receiving surface and the lens assembly along the optical path. The at least one aperture causes the spectrum receiving surface of the film thickness measuring unit to receive only the reflected light generated by the hole bottom. In the present embodiment, the receiving component includes a first aperture 2211 and a second aperture 2212, and the second aperture is disposed coaxially with the first aperture. The first aperture 2211 is used to filter out reflected light having a first characteristic, and the second aperture 2212 is used to filter out reflected light having a second characteristic. In one embodiment, a reflection angle of the reflected light having the first characteristic is smaller than a reflection angle of the reflected light having the second characteristic.

As shown in FIG. 4, the first aperture 2211 may be disposed coaxially with the second aperture 2212, and the size of the first aperture 2211 is larger than that of the second aperture 2212. In the optical path, the first aperture 2211 is closer to the object plane for filtering out small-angle reflected light (i.e. L1, L2) emitted by the peripheral region of the TSV hole to achieve selective signal reception. The second aperture 2212 is relatively far away from the object plane and may filter out large-angle reflected light (L4) emitted from the outer edge of the TSV hole. The spectrometer 222 may receive only small-angle signal light that is emitted near the center of the optical axis of the object plane and that characterizes the film thickness of the TSV hole. In addition, the same position (for example, the peripheral area of the TSV hole) may generate large-angle reflected light (L3) while generating small-angle reflected light. The large-angle reflected light can also be filtered out by the second aperture 2212 based on the arrangement of the first and second apertures.

Based on the above configuration, the signal light from the TSV hole bottom of the sample 10 and the peripheral region of the hole passes through the lens assembly 20, and then through the first aperture 2211 and the second aperture 2212, and the spectrometer 222 may only receive small-angle signal light that characterizes the film thickness on TSV hole bottom.

As described above, the measuring system is configured based on the conjugate relationship between the object plane and the image plane. Therefore, there is a one-to-one correspondence between the sample surface and the image formed by the spectrometer 222. Accordingly, on the optical path, the signal selective receiving component 24 is disposed in front of the receiving end 25 (spectrometer), thereby facilitating the determination of the film thickness distribution at the bottom of the hole. The optical system is configured according to the conjugate relationship between the object plane and the image plane, and a signal selective receiving component is arranged to optimize the signal filtering effect and reduce the influence of stray light in the system.

It can be understood by those skilled in the art that the size of the above two apertures are related to parameters of the measured TSV hole, the magnification of the signal collection system, the distance between the collection system plane and the image plane, the position of the aperture, and the like. When other factors are constant, the larger the aspect ratio of the TSV hole is, the smaller the required aperture size will be; the larger the magnification of the imaging counterpart is, the smaller the required aperture size will be; the greater the distance between the object plane and the image plane is, the smaller the required aperture size will be; the closer the aperture is to the image plane, the smaller the required aperture size will be.

The function of the imaging unit 21 of the measuring system in the measurement of the TSV hole is described below.

The imaging unit 21 obtains imaging based on the received first reflected beam, and the processing unit 23 implements identification, positioning, and aperture size analysis of the TSV hole based on data received from the imaging unit 21. The detection path may be determined based on the area of the TSV hole distributed over the sample being measured. In this embodiment, the detection paths of these detection regions are planned according to the spot size. After the path planning is completed, the TSV holes are measured by region.

The invention also proposes a measuring method comprising the following steps:

obtaining imaging data of a sample surface based on a first reflected beam from the sample, wherein the imaging data includes distribution information of the TSV hole in at least one detection region of the sample; obtaining data of the film thickness on the TSV hole bottom based on a second reflected beam from the sample; and determining a detection path of the TSV hole based on the distribution information, and obtaining data of the film thickness on each TSV hole bottom based on the detection path of the hole, thereby implementing measurement of the TSV hole in the at least one detection region.

The process for determining the detection path of the TSV hole based on the distribution information includes: determining the at least one detection region based on a regional characteristic of the sample surface, thereby determining a detection path of the at least one detection region; and determining a distribution of the TSV hole in the at least one detection region based on a characteristic of the TSV hole, thereby determining the detection path of the TSV hole. The above method will be described in detail below with reference to FIGS. 5 and 6.

Figure 5:
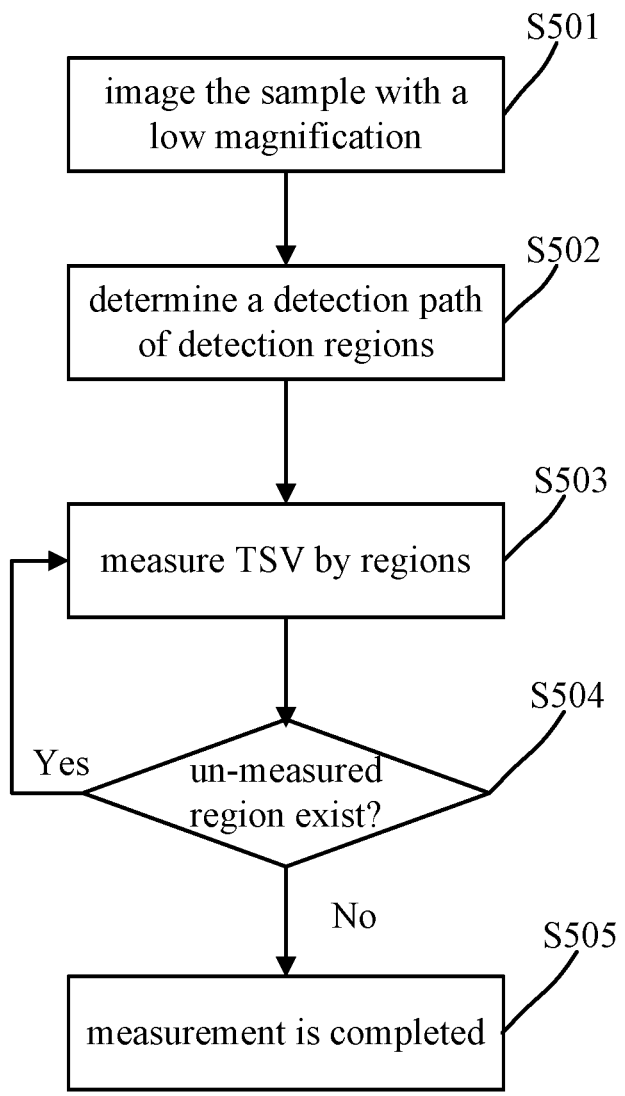
FIG. 5 is a flow chart showing the operation of a measuring system according to an embodiment of the present invention.

FIG. 5 shows a flow chart of the operation of a measuring system in accordance with an embodiment of the present invention.

First, step S501 is performed. Specifically, the spot is focused on the sample surface for imaging (not limited to low magnification imaging), thereby obtaining imaging data of the sample surface. The imaging data may be used in subsequent steps to determine the detection region and the detection path of the detection region.

Then, step S502 is performed to determine the detection path of the detection region. In this step, the region division is performed based on the characteristics of a plurality of detection regions on the sample 10, thereby determining the detection paths of the plurality of detection regions. For example, the detection path of the detection region may be planned according to the characteristic of each detection region. In an embodiment, the detection path planning of the detection regions may also be performed according to the spot size.

Next, step S503 is performed to measure the TSV hole by region. In this step, the selected region is measured in accordance with the determined detection path. It can be understood that the specific region can also be measured according to a user's instruction. The specific measurement procedure will be described below in conjunction with FIG. 6.

Next, step S504 is performed to determine whether there is an unmeasured region.

If the result is "YES", step S503 is performed. If the result is "NO", the processing proceeds to step S505 to end the measurement operation of the current sample.

Figure 6:
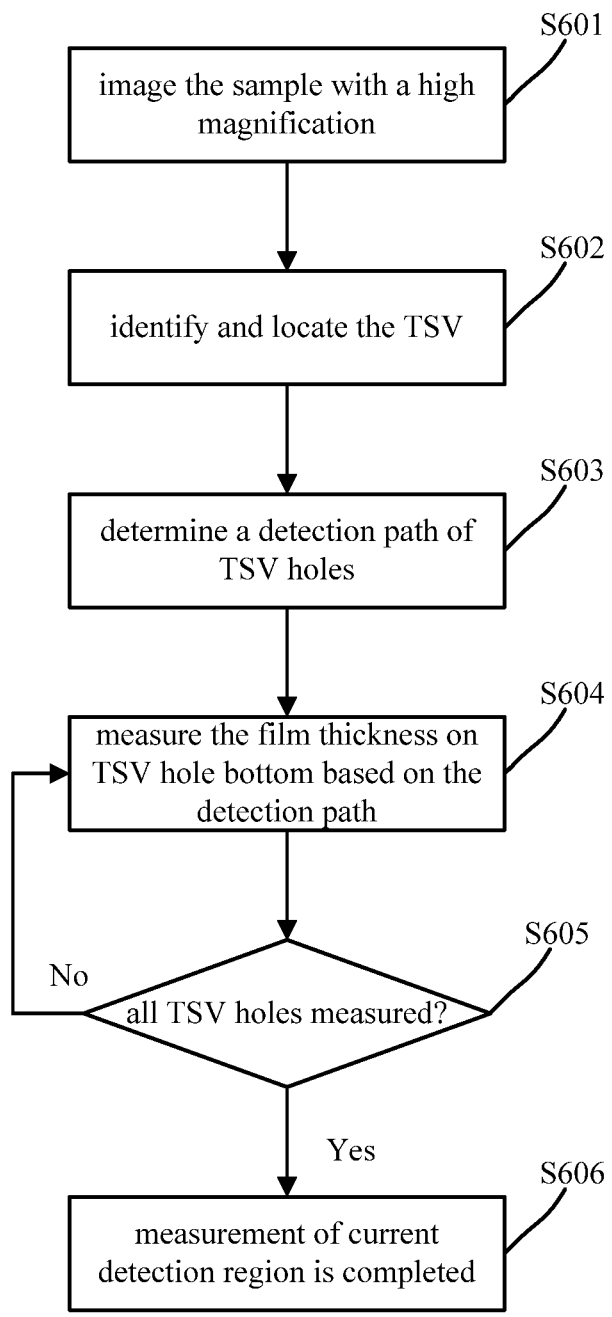
FIG. 6 is a flow chart of measuring TSV holes in a single area according to an embodiment of the present invention.

The flow chart shown in FIG. 5 includes a step of measuring the TSV hole by region (i.e., step S503), which is explained in detail below. FIG. 6 shows a flow chart for measurement of TSV hole in a single region. It should be clarified that the measurement procedure shown in FIG. 6 is based on high magnification imaging of the sample surface.

First, step S601 is performed. Specifically, the spot is focused to the region on the sample surface for imaging (not limited to high magnification imaging). Through the imaging process, information indicating position, contour, or aperture size of the circular hole on the surface of the sample may be obtained according to the result of the image recognition. It could be understood that the imaging process in this step may be the same process as the imaging process of determining the region detection path described above, that is, when imaging multiple regions, the circular hole distribution in a single region may be also obtained.

Then, step S602 is performed to identify and locate the TSV hole. In this step, according to the characteristic of the TSV hole of the sample, it is able to determine which of the circular holes on the sample surface is the TSV hole, thereby determining the center position and the aperture size information of the TSV hole.

Next, step S603 is performed to determine detection path of the TSV holes. In this step, the detection path is determined based on the distribution of the TSV holes on the sample to be measured, thereby determining the measurement order of the TSV holes.

Then, step S604 is performed to measure the film thickness on the TSV hole bottom. In this step, according to the determined detection path, the sample is moved, and then the center of the corresponding TSV hole is moved to the center of the spot, and then the center of the spot is focused to the hole bottom. Thus, the spectrometer 25 may receive signal light that characterizes the film thickness on the hole bottom, thereby obtaining the film thickness and corresponding distribution of the current TSV hole bottom.

Next, step S605 is performed to determine whether all the TSV holes in the current region have been completely measured. In this step, it is determined whether all the TSV holes have been completely measured according to the detection path determined in step S603. If the result is "YES", step S604 is performed to measure the next TSV hole, and if the result is "NO", the TSV hole measurement of the current region is ended. It could be understood that although the detection path has been determined in step S603, the user may also specify to measure a portion of the TSV holes or stop the measurement directly.

After the measurement is completed for the TSV hole(s) in the single region in accordance with the flow chart shown in FIG. 6, the TSV hole(s) of the next region is then measured according to the determined detection path until the measurement of the sample 10 is completed.

The invention realizes small area measurement under the condition of large spot illumination in an optical system, so that large area imaging and small area film thickness measuring can be realized in the same optical path, and then an automatic analysis of TSV holes on the chip is achieved. The invention is a non-contact measuring method, which may not cause damage to the chip or cause pollution, and has a fast measurement speed, and can be used for process monitoring in the production process.

The present invention has been described with reference to the specific examples, which are intended to be illustrative and not restrictive. It would be apparent to those skilled in the art that changes, additions or deletions may be made to the disclosed embodiments without departing from the spirit and scope of the invention.

What is claimed is:

1. A metrology system, comprising:
    a lens assembly configured to receive reflected light from a sample surface and split the reflected light into at least a first reflected beam and a second reflected beam;
    an imaging sensor configured to receive the first reflected beam to generate imaging data of the sample surface, wherein the imaging data includes distribution information of at least one detection area located in at least one detection region of the sample;
    a film thickness measuring unit configured to receive the second reflected beam, and obtain film thickness data of a specified object in the detection area, wherein the film thickness measuring unit includes at least an aperture and a spectrometer; and
    a processor, communicatively coupled to the imaging sensor and the film thickness measuring unit, and configured to:
        determine a detection path of the at least one detection area based on the distribution information, and cause the film thickness measuring unit to obtain film thickness data of the detection area based on the detection path,
        wherein, on an optical path, a spectrum receiving surface of the imaging sensor is configured to be optically conjugate with the sample surface, and a spectrum receiving surface of the film thickness measuring unit are configured to be optically conjugate with the sample surface.

2. The system of claim 1, wherein the processor is further configured to:
    determine the at least one detection region based on a regional characteristic of the sample surface, thereby determining a detection path of the at least one detection region; and
    determine the distribution of the detection area located in the at least one detection region based on a characteristic of the detection area, thereby determining the detection path of the detection area.

3. The system of claim 1, wherein the detection area includes a recession or a protrusion.

4. The system of claim 3, wherein when the detection area includes a hole to be measured, the processor is further configured to:
    obtain circular hole information based on the imaging data, wherein the circular hole information includes distribution information and characteristic information of the circular hole; and
    determine the distribution of the hole to be measured on the sample surface based on a characteristic of the hole to be measured and the circular hole information.

5. The system of claim 1, wherein at least one aperture is disposed between the spectrum receiving surface of the film thickness measuring unit and the lens assembly along the optical path, so that the spectrum receiving surface of the film thickness measuring unit only receives reflected light from the detection area.

6. The system of claim 5, wherein the first aperture is disposed coaxially with the second aperture.

7. The system of claim 6, wherein an aperture size of the first aperture is greater than an aperture size of the second aperture.

8. The system of claim 1, wherein the film thickness measuring unit comprises a first aperture configured to filter out reflected light with a first characteristic and a second aperture configured to filter out reflected light with a second characteristic.

9. The system of claim 8, wherein a reflection angle of the reflected light with the first characteristic is less than a reflection angle of the second aperture with the second characteristic.

10. The system of claim 1, wherein the designated detection area is determined by at least one of:
    determining, by the processor, the designated detection area according to the detection path of the at least one detection area;

determining, by the processor, the designated area based on a user input.

11. The system of claim 1, further comprising:
an electrical platform configured to carry the sample, wherein the electrical platform moves under control of the processor; and
a light source assembly configured to provide an incident beam to the sample surface, wherein the light source assembly includes a xenon lamp.

12. A metrology method, comprising:
obtaining, by an imaging sensor, imaging data of a sample surface based on a first reflected beam from the sample, wherein the imaging data includes distribution information of a detection area located in at least one detection region of the sample;
obtaining, by a film thickness measuring unit, film thickness data of the detection area based on a second reflected beam from the sample surface, wherein the film thickness measuring unit includes at least an aperture and a spectrometer; and
determining, by a processor, a detection path of the detection area based on the distribution information, and obtaining film thickness data of each detection area based on the detection path.

13. A method of claim 12, wherein determining the detection path of the at least one detection area based on the distribution information comprises:
determining, by a processor, the at least one detection region based on a regional characteristic of the sample surface, thereby determining a detection path of the at least one detection region; and
determining, by a processor, the distribution of the detection area located in the at least one detection region based on a characteristic of the detection area, thereby determining the detection path of the detection area.

14. A method of claim 12, wherein when the detection area includes a hole to be measured, determining the distribution of the hole to be measured in the at least one detection region based on the characteristic of the hole comprises:
obtaining, by the processor, circular hole information based on the imaging data, wherein the circular hole information includes distribution information and characteristic information of the circular hole; and
determining, by the processor, the distribution of the hole to be measured in the at least one detection region based on a characteristic of the hole to be measured and the obtained circular hole information.

15. A metrology method, comprising:
splitting reflected light from a sample surface into at least a first reflected beam and a second reflected beam;
generating imaging data of the sample surface based on the first reflected beam, wherein the imaging data includes distribution information of multiple detection areas located in one or more detection regions of the sample;
determining position information of the multiple detection areas based on the distribution information, and obtaining film thickness data at each of the multiple detection areas based on the second reflected beam and the distribution information, wherein the sample surface is moved according to the position information to cause the second reflected beam to reflect from each of the multiple detection areas.

16. A method of claim 15, further comprising:
determining a detection path of the detection area based on the distribution information,
wherein based on a regional characteristic of the sample surface, the one or more detection regions and a detection path of the one or more detection regions are determined; and
wherein based on a characteristic of the detection area, the distribution of the detection area located in the one or more detection regions and the detection path of the detection area are determined.

17. A method of claim 16, when the detection area includes a hole to be measured,
obtaining circular hole information based on the imaging data, wherein the circular hole information includes distribution information and characteristic information of the circular hole; and
determining the distribution of the hole to be measured on the one or more detection regions based on a characteristic of the hole to be measured and the obtained circular hole information.

18. A method of claim 15,
wherein before splitting the reflected light from the sample into the first reflected beam and the second reflected beam, the method further comprises providing a system including a lens assembly, an imaging sensor, a film thickness measuring unit, and a processor,
wherein
splitting, by the lens assembly, the reflected light into the first reflected beam and the second reflected beam,
obtaining, by the imaging sensor, the imaging data of the detection area,
obtaining, by the film thickness measuring unit, the film thickness data of the detection area,
determining, by the processor, the position information, and
causing, by the processor, the film thickness measuring unit to obtain the film thickness data of the detection area.

* * * * *